Feb. 22, 1966 P. S. SIZER 3,236,255
PRESSURE OPERATED SAFETY VALVE
Original Filed April 21, 1959 5 Sheets-Sheet 1
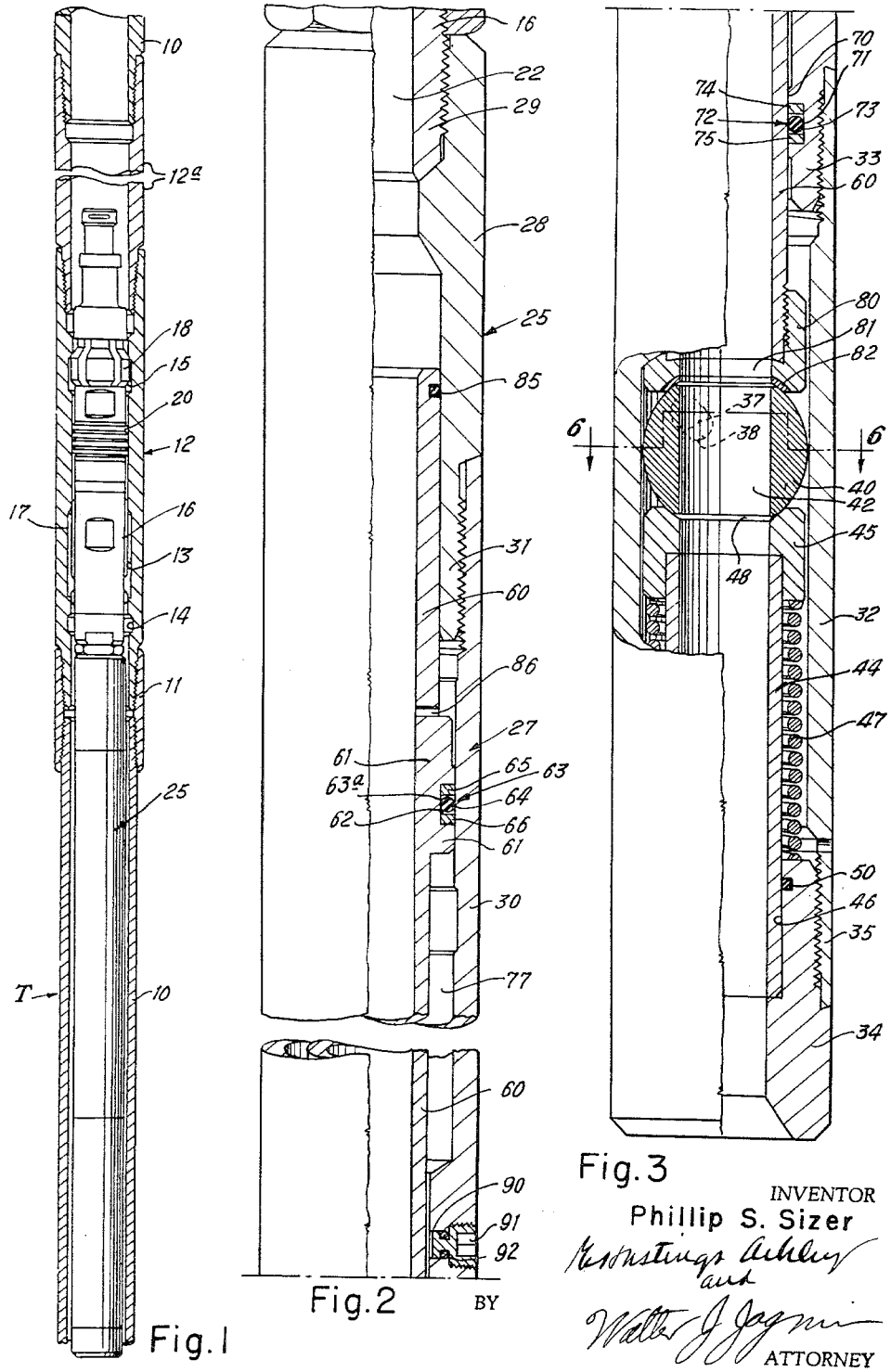
INVENTOR
Phillip S. Sizer
ATTORNEY

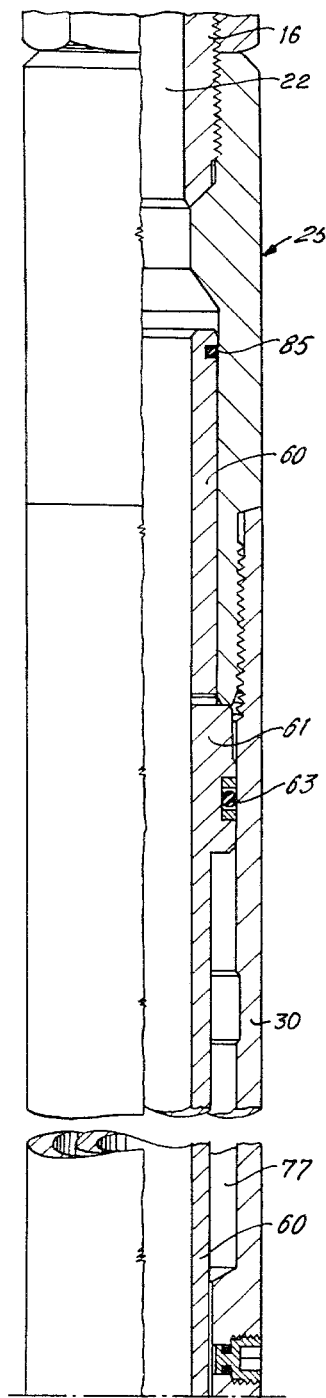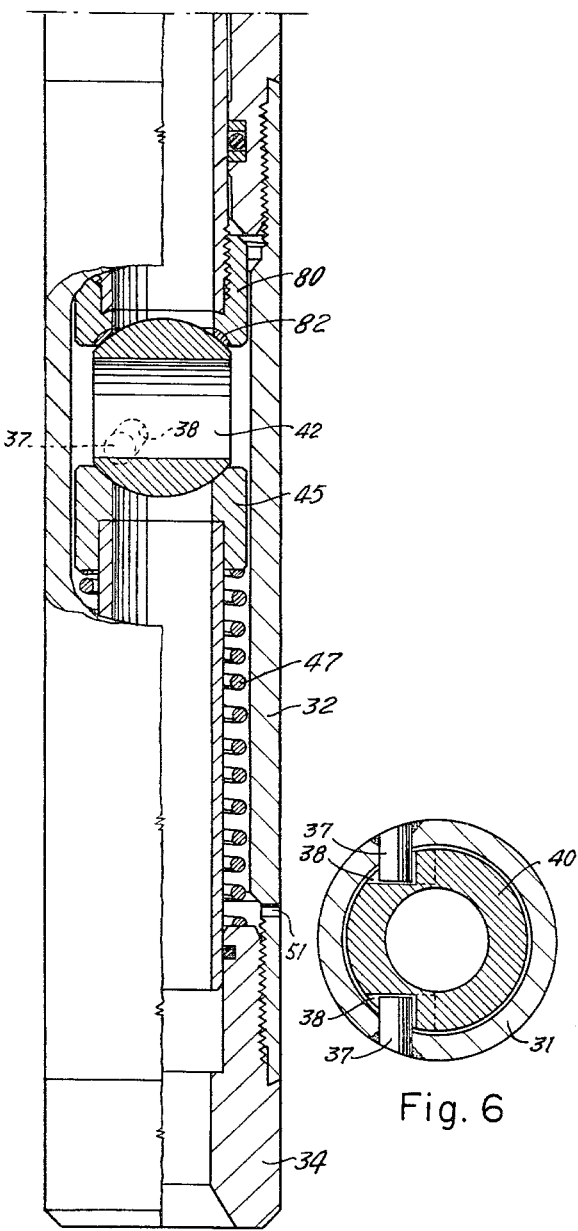
Fig. 4
Fig. 5
Fig. 6
INVENTOR
Phillip S. Sizer
BY
ATTORNEY

Feb. 22, 1966   P. S. SIZER   3,236,255
PRESSURE OPERATED SAFETY VALVE
Original Filed April 21, 1959   5 Sheets-Sheet 3

INVENTOR
Phillip S. Sizer

BY
ATTORNEY

Feb. 22, 1966 P. S. SIZER 3,236,255
PRESSURE OPERATED SAFETY VALVE
Original Filed April 21, 1959 5 Sheets-Sheet 4

INVENTOR
Phillip S. Sizer
BY
ATTORNEY

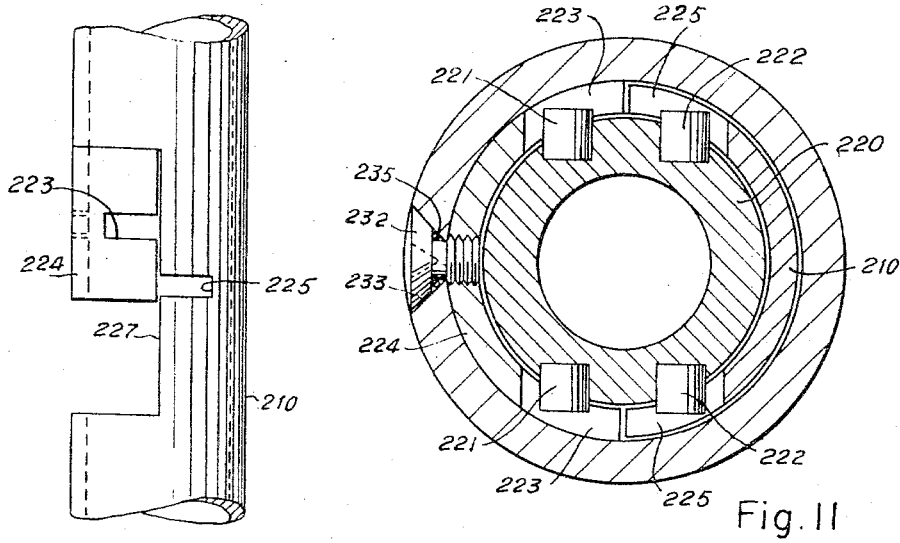
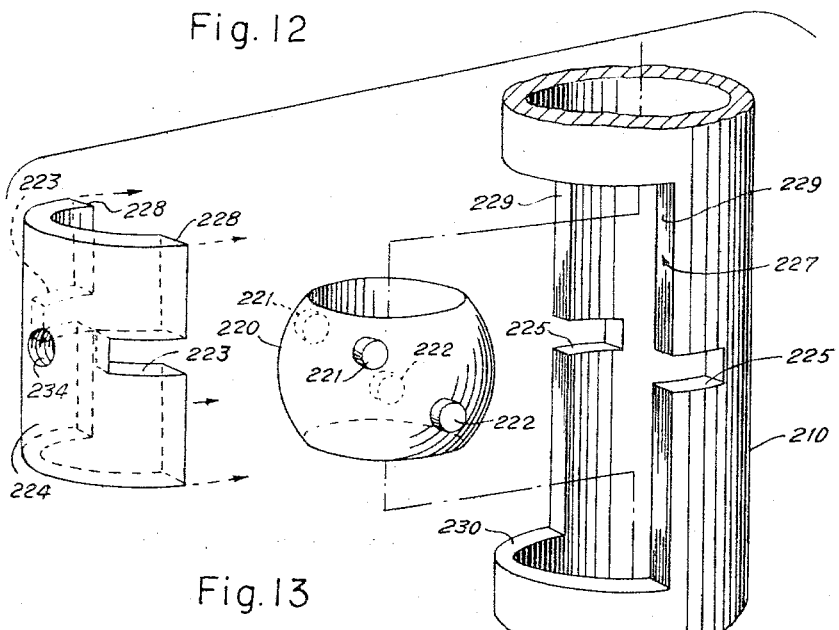
Fig. 12
Fig. 11
Fig. 13
INVENTOR
Phillip S. Sizer
BY
ATTORNEY 3,236,255
PRESSURE OPERATED SAFETY VALVE
Phillip S. Sizer, 3606 Sequin St., Dallas County, Tex.
Continuation of application Ser. No. 807,831, Apr. 21, 1959. This application Apr. 24, 1963, Ser. No. 275,363
9 Claims. (Cl. 137—494)

This application is a continuation of Serial No. 807,831, filed April 21, 1959, now abandoned.

This invention relates to well tools and more particularly to pressure operated valves for controlling the flow of fluids through a well flow conductor.

One object of the invention is to provide a new and improved automatic pressure operated valve assembly or well tool for controlling the flow of well fluids through a well conductor.

Another object of the invention is to provide a pressure operated valve assembly for controlling the flow of well fluids through a well conductor which may be preloaded by a charge of pressurized gas to open or close at any predetermined value of the fluid pressure in the well conductor downstream of the valve.

Still another object of the invention is to provide a valve assembly for controlling the flow of well fluids through a well conductor which is provided with biasing means which tend to hold the valve in a closed position, the valve being constructed to be moved to open position when the pressure of the fluid in the flow conductor immediately downstream of the valve exceeds a predetermined value.

A further object of the invention is to provide a valve assembly of the character described having a ball valve with a flow passage therethrough which is rotatable to an open position wherein its flow passage is in communication with the flow passage of the well flow conductor and a closed position wherein its flow passage is removed from communication with the flow passage of the well conductor.

A still further object of the invention is to provide a valve assembly of the character described having a ball valve biased toward a closed position by a biasing means of a predetermined value which is moved to its open position by the pressure of the fluids flowing through the valve when such pressure downstream of the valve exceeds such predetermined value and which is again automatically returned to its closed position when the fluid pressure downstream of the valve drops below such predetermined value.

Another further object of the invention is to provide a valve assembly of the character described which includes an elongate body in which a ball valve is rotatably mounted for rotation about a transverse axis relative to the body, the valve being provided with a biasing means acting against the ball valve tending to rotate it to a closed position and with a pressure responsive means which acts upon the ball valve to rotate it to its open position against the resistance of the biasing means whenever the fluid pressure downstream of the valve exceeds a predetermined value.

Still another object of the invention is to provide a valve assembly of the character described for controlling the flow of fluids through a flow conductor wherein the pressure responsive means comprises a piston biased longitudinally by a predetermined charge of compressed gas toward a position away from the valve member permitting said valve member to be moved to its closed position, the pressure of the fluids in the well conductor downstream of the valve member acting on the piston to move it longitudinally against the force of the charge of compressed gas to engage and move the valve to its open position.

Still another object of the invention is to provide a valve assembly of the character described wherein the means acting on the valve member tending to move it to its closed position includes a spring.

A further object of the invention is to provide a pressure operated valve assembly or well tool for controlling the flow of well fluids through a well conductor which is responsive to the pressure differential thereacross to shut off flow of fluids therethrough when the pressure differential thereacross rises above or exceeds a predetermined value.

Still another object of the invention is to provide a pressure operated valve assembly for controlling the flow of well fluids through a well conductor which is preloaded by a resilient means to close when the pressure differential across the valve rises above or exceeds a predetermined value.

A further object is to provide a well tool or valve assembly of the character described having a ball valve with a flow passage therethrough which is rotatable to an open position wherein its flow passage is in communication with the flow passage of the well flow conductor and a closed position wherein its flow passage is removed from communication with the flow passage of the well conductor, the flow passage of the ball valve being substantially equal in cross-section to the flow passage of the well tool whereby substantially unrestricted flow through the valve occurs when the ball valve is in its open position.

Additional objects and advantages of the invention will be readily apparent from the reading of the following description of a device constructed in accordance with the invention, and reference to the accompanying drawings thereof, wherein:

FIGURE 1 is a view, partly in elevation and partly in section, showing a well tool embodying the automatic pressure controlling valve assembly of the invention mounted in a well flow conductor by means of a suitable anchoring and sealing tool;

FIGURE 2 is an enlarged view, partly in elevation and partly in section, of the upper portion of the well tool embodying the invention;

FIGURE 3 is a view similar to and forming a continuation of FIGURE 2 showing the lower portion of the well tool, with some parts broken away to show the ball valve, the ball valve being shown in its open position;

FIGURES 4 and 5 are views similar to FIGURES 2 and 3, showing the ball valve in its closed position;

FIGURE 6 is a cross-sectional view taken on the line 6—6 of FIGURE 3;

FIGURE 11 is a cross-sectional view taken on line 11—11 of FIGURE 8;

FIGURE 12 is a fragmentary elevational view showing the mounting means for the ball valve illustrated in FIGURES 8 and 10; and FIGURE 13 is an exploded perspective view of the ball valve and its mounting means illustrated in FIGURES 8 and 10.

Figure 7:
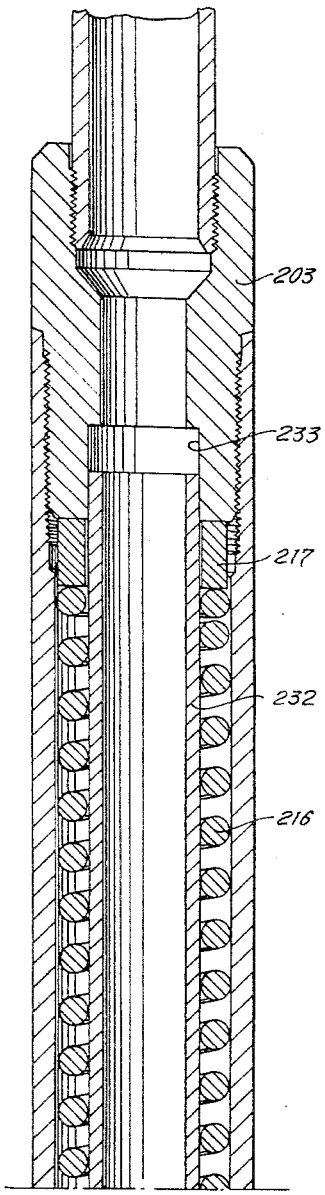
FIGURE 7 is a view, partly in elevation and partly in section, showing the upper portions of a modified form of the well tool embodying the invention.

Referring now particularly to FIGURE 1, a string of well flow conductor or well tubing T is shown formed of a plurality of tubing joints or sections 10 connected by couplings 11. A landing nipple or housing 12 having suitable internal locating recesses 13 and 14 and a locking recess 15 by means of which an anchoring and sealing tool 16 may be located and locked in the landing nipple 12 against accidental longitudinal displacement is also connected in the tubing string T by couplings 11 and a tubular flow sleeve 12a so as to form a part thereof. The anchoring tool 16 may be of the type disclosed in the patent to Ira A. Miller, No. 2,673,614, and has locating keys 17 which engage in the locating recesses 13 and 14 and lock dogs 18 which engage in the locking recess 15 to hold the anchoring tool against displacement from within the landing nipple. The anchoring and sealing tool is also provided with packing rings or seal means 20 which seal between the anchoring tool and the landing nipple whereby fluids flowing through the well tubing are directed through the central longitudinal flow passage 22 of the anchoring and sealing tool when the latter is properly located and locked in the landing nipple.

The pressure operated flow controlling or safety valve assembly 25 embodying the invention includes an outer tubular member 27 which comprises an upper sub 28 threaded on the externally threaded lower end 29 of the anchoring and sealing tool 16 whereby the valve assembly may be secured and supported in the landing nipple 12 in the well flow conductor. The outer tubular member also includes an intermediate section or cylinder 30 whose upper end is threaded on the reduced lower end 31 of the upper sub, a lower sleeve or valve housing 32 threaded on the reduced lower end 33 of the intermediate sleeve, and a tubular plug or bushing 34 threaded into the enlarged internally threaded lower end 35 of the lower sleeve or valve housing.

The lower section or valve housing 32 is provided with a pair of internal pivot pins 37 which are rigidly secured in the bore of the housing by any suitable means, such as welds as shown in FIGURE 6. The pins 37 project into the bore of the valve housing and engage in external slots 38 formed in the periphery of a ball valve 40 disposed in the bore of the valve housing intermediate the ends thereof. The pins and the slots are offset from the central longitudinal axis of the valve housing and of the ball valve so as to cause the ball valve 40 to rotate approximately 90 degrees from the open position illustrated in FIGURE 3 to the closed position illustrated in FIGURE 5 upon upward longitudinal movement of the ball valve in the valve housing. The ball valve 40 is provided with a flow passage 42 which extends therethrough and provides for substantially unrestricted flow through the valve assembly.

The ball valve is biased toward the upper closed position illustrated in FIGURE 5 by a spring pressed actuating sleeve 44 whose enlarged upper end or head 45 bears against the under side of the ball valve and whose lower end is slidable in a counterbore 46 the bushing 34. A helical coiled spring 47 confined between the upper end of the bushing and the enlarged head 45 of the actuating sleeve biases the sleeve longitudinally upwardly toward the ball valve and into operating engagement with the lower surface of the ball valve. The portion of the bore of the enlarged head of the actuating sleeve forming the upper end of the bore of the sleeve is concave and provides a bearing surface 48 on which the ball valve rides and may slidably move. An O-ring 50 is mounted in an internal annular groove in the counterbore 46 of the bushing 34 and engages the tubular sleeve 44 and the bushing to serve as a wiper to prevent undesirable accumulation of sand or other foreign matter therebetween. A lateral port 51 in the wall of the valve housing just above the upper end of the bushing permits entry and escape of fluids into and out of the valve housing as the sleeve 44 and the ball valve 40 are moved longitudinally in the valve housing.

An elongate piston sleeve or operator member 60 is longitudinally slidable in the cylinder 30 and has an enlarged external annular piston forming flange 61 intermediate its ends. An external annular groove 62 is formed in the periphery of the piston flange and a seal assembly 63 including an O-ring 64 and a pair of back-up rings 65 and 66 are disposed in the groove and engage the bore wall of the cylinder 30 to seal between the piston and the cylinder wall. The piston sleeve extends downwardly below the lower end of the cylinder 30 and into the upper portion of the valve housing 32 past an internal annular flange 70 formed in the lower portion of the bore of the cylinder. An internal annular groove 71 is formed in the flange for receiving a packing assembly 72 comprising an O-ring 73 and upper and lower back-up rings 74 and 75, respectively, for sealing between the cylinder and the lower portion of the piston sleeve.

A valve seat member or ring 80 is threaded onto the lower end of the piston sleeve 60 and is disposed to engage the upper surface of the ball valve 40. The portion of the valve seat surrounding the bore 81 thereof is provided with an insert of hardened wear resistant seating material 82 which is formed with a concave surface bearing against the upper surface of the ball valve and sealingly movably engaging the same. The hardened insert 82 reduces wear on the valve seat which would result from the movement of the ball valve with respect to the seat under the fluid pressure urging the valve into engagement with said valve seat and the flow of solid particles thereacross.

The portion of the piston sleeve above the piston flange 61 extends upwardly into the enlarged lower portion of the bore of the sub 28 and an O-ring 85 is mounted in an external annular groove at the upper end of such upper portion of the sleeve and engages the bore wall of the sub to serve as a wiper and prevent accumulation of sand or other foreign matter between the sleeve and the bore wall of said sub. A lateral port 86 is formed in the wall of the piston sleeve above the piston flange 61 to provide for the venting of fluids which might be trapped above the piston flange and below the O-ring 85 and also to provide for entry of fluid pressure into the space between the sleeve and the cylinder, whereby the fluid pressure within the bore of the well tool above the ball valve 40 may act downwardly on the piston flange 61 to move the piston sleeve 60 downwardly in the cylinder.

It will be apparent that the annular space between the piston sleeve 60 and the bore wall of the cylinder between the upper packing or sealing assembly 63 and the lower packing or sealing assembly 72 defines a closed pressure chamber 77, and a charge of compressed gas of any desired predetermined pressure may be introduced into the pressure chamber through an inlet aperture or filler port 90. The filler port is closed by a plug 91 which is threaded into the port and has an O-ring seal member 92 mounted thereon to engage the bore wall of the port to prevent fluid leakage therethrough when the plug is inserted to close the port.

It will be readily apparent that when a charge of gas is introduced into the chamber 77, its pressure acts on the underside of the piston flange 61 and tends to move the piston sleeve 60 upwardly in the cylinder. Such upward movement of the piston sleeve moves the seat member 80 carried thereby upwardly and permits the spring biased actuating sleeve 44 to urge the ball valve 40 upwardly in the valve housing. Such upward movement of the spring pressed actuating sleeve, moving the ball valve 40 upwardly with respect to the pivot pins 37, causes the ball valve to pivot about the pins 37 from the open position shown in FIGURE 3 to the closed position shown in FIGURE 5 since the slots 38 in the periphery of the ball valve, which interengage with the pins 37, provide a pivot laterally offset from the axis of the ball valve, whereby longitudinal movement of the ball valve in the bore of the valve housing 31 causes the ball valve to pivot on seats 82 and 48 about the pins.

Upward movement of the piston sleeve 60 and the valve seat 80 carried thereby is limited by the engagement of the upper end of the piston flange 61 with the lower end of the sub 28, as shown in FIGURE 4, whereby upward movement of the seat 80 is stopped at a position in which the ball valve 40 is disposed with the bore 42 through the ball valve extending transversely of the housing so that the body of the ball valve closes the bore 81 of the seat and also closes the bore of the piston sleeve 60. Thus, the ball valve cuts off all upward flow of fluids through the piston sleeve and the valve assembly, the charge of gaseous pressure fluid within the chamber 77 biasing the piston sleeve 61 upwardly to a position in which the ball valve 40 is permitted to be moved by the spring pressed actuating sleeve 44 to the closed position shown in FIGURE 5.

However, it will readily be seen that fluid pressure entering into the annular space between the piston sleeve 60 and the cylinder 30 above the piston flange 61 will act downwardly on the full cross-sectional area of the flange 61 of the piston sleeve, and a sufficient pressure in the bore of the piston sleeve acting downwardly on the piston flange will move the sleeve downwardly toward the position shown in FIGURE 3. Downward movement of the piston sleeve and the seat 80 carried thereby biases the ball valve 40 downwardly against the upward biasing force exerted thereon by the spring pressed sleeve 44 and again pivots the ball on the seats 82 and 48 about the pins 37 to the position shown in FIGURE 3 wherein a rectilinear flow course is provided through the valve assembly. Since the bores of the bushing 34, the actuating sleeve 44, the ball valve 40, the piston sleeve 60 and the sub 28 are all substantially equal in cross section, it will also be seen that a substantially unrestricted flow through the valve assembly is permitted and that operation of the valve is controlled by fluid pressure.

In use, the valve assembly 25 is pre-set to close at a desired pressure by introducing a charge of gas into the chamber 77 of a sufficient value to assure that the piston sleeve 60 will move upwardly toward the position shown in FIGURES 4 and 5 when the pressure of the well fluids present in the bore of the valve assembly above or downstream of the ball valve 40 falls below a pressure adequate to hold the piston sleeve in its downward position against the charge in the chamber 77 plus the force exerted by the spring 47. Thus, when the pressure in the well flow conductor or tubing downstream of the ball valve exceeds such predetermined value and passes through the port 86 and acts on the upper end of the piston flange 61, the piston sleeve 60 is moved downwardly against the resistance of the charge of gas in the chamber 77 and against the resistance of the spring 47 urging the sleeve 44 upwardly. This causes the ball valve 40 to assume the open position illustrated in FIGURE 3 and permits fluids to flow through the valve. When, however, the well fluid pressure downstream of the ball valve falls below such predetermined value, the force exerted on the piston flange 61 by the charge of gas in the chamber 77 plus the force exerted by the spring 47 will overcome the downward force of the fluid pressure acting on the upper end of the piston flange and sleeve, and will move the piston sleeve 60 upwardly to the position shown in FIGURES 4 and 5 and permit the ball valve 40 to be moved to the closed position by the spring pressed actuating sleeve 44.

It will thus be readily apparent that the fluid pressure conditions within the bore of the valve assembly which control the actuation of the valve may be readily varied by varying the charge of compressible gas or fluid in the chamber 77. Also it will be seen that actuation of the valve is controlled by the pressure of the fluid present in the chamber 77 of the valve assembly; that the ball valve is normally biased toward the closed position and is opened by the presence of sufficient fluid pressure in the bore of the assembly and in the well flow conductor downstream of the ball valve; that the valve assembly provides for a substantially unrestricted rectilinear flow of fluids therethrough when open and that the valve may be readily closed to shut off all flow through the assembly and through the well flow conductor in which the assembly is positioned. It will also be seen that actuation of the ball valve is positive, being effected by movement of the piston sleeve or operator member and by movement of the spring biased actuating sleeve. It will also be readily apparent that should the seals 63 and 72 leak slightly so that higher pressure fluids present in the well bore and flowing through the valve assembly may leak or pass into the chamber 77, such leakage will not cause failure of the valve assembly to close. Instead, it will merely cause the valve assembly to close prematurely since reduction of fluid pressure in the well conductor downstream of the ball valve 40 permits such higher pressure in the chamber 77 to move the operating piston sleeve 60 upwardly sooner and permit the spring pressed actuating sleeve 44 to move the ball valve to the closed position. Such closing operation will, under these conditions, be effected at a lesser drop in pressure within the tubing than would have occurred had the seals not leaked. Obviously, the ball valve will be moved to a closed position upon the occurrence of any pressure within the flow conductor downstream of the ball valve less than the combined force of the pressure in the chamber 77 acting on the piston flange and the force exerted by the spring 47, so that the ball valve will close properly under all operating conditions.

Referring now particularly to FIGURES 7 through 13 of the drawings, the modified pressure operated flow control or safety valve well tool or assembly 200 includes a tubular valve housing 201 provided at its upper end with an upper sub 203 having its lower reduced portion threaded into the upper end of the valve housing. The upper sub is internally threaded at its upper end whereby the valve assembly or well tool 200 may be secured to the lower end 205 of an equalizing sub which may be of the type shown on page 4138 of the Composite Catalog of Oil Field Equipment and Services, 1957 edition. The equalizing sub in turn may be secured to the lower end of an anchoring and sealing tool such as that disclosed in the patent to Miller, No. 2,673,614. A tubular plug or bushing 208 has its reduced upper end portion 209 threaded into the lower end of the valve housing 201.

A valve actuating sleeve 210 longitudinally slidably mounted in the valve housing between the upper sub 203 and the plug 208 has a reduced lower portion 211 which extends downwardly through the plug and which provides an external downwardly facing annular stop shoulder 212. The annular stop shoulder abuts the upper end of the plug to limit downward movement of the actuating sleeve in the valve housing. A tubular spring retainer 215 is threaded into the upper end of the actuating sleeve 210. A large helical main spring 216 disposed in the valve housing has its opposite ends bearing against the lower end of an adjusting ring 217 and against the upper end of the spring retainer. The upper end of the adjusting ring bears against the bottom surface of the top sub 203. The spring 216 biases the actuating sleeve 210 downwardly to the position illustrated in FIGURE 8.

A ball valve 220 is mounted in the actuating sleeve 210 for rotation about an axis transverse to the longitudinal axis of the actuating sleeve by means of a pair of pivot pins 221 which extend outwardly of the ball valve into the slots 223 of a cylindrical pivot section 224 rigidly secured to the valve housing and by means of a pair of actuating pins 222 which extend outwardly of the ball valve into the recesses 225 of the actuating sleeve. The fixed cylindrical pivot section 224 is received in a longitudinal slot 227 of the actuating sleeve. The vertical sides 228 of the fixed cylindrical section abut the vertical sides 229 of the longitudinal slot of the actuating sleeve to prevent rotational movement of the actuating sleeve in the valve housing. Upward movement of the actuating sleeve in the valve housing is limited by engagement of the semi-circular upwardly facing stop shoulder 230 of the actuating sleeve with the lower end of the fixed cylindrical section 224. The pivot section 224 is fixed immovably to the valve housing by means of a screw 232 which extends through a lateral beveled aperture 233 of the valve housing into a threaded lateral bore 234 of the cylindrical pivot section 224. The screw 232 is provided with an O-ring or sealing means 235 which seals between the screw 232 and the valve housing to prevent flow of fluids through the aperture.

Figure 8:
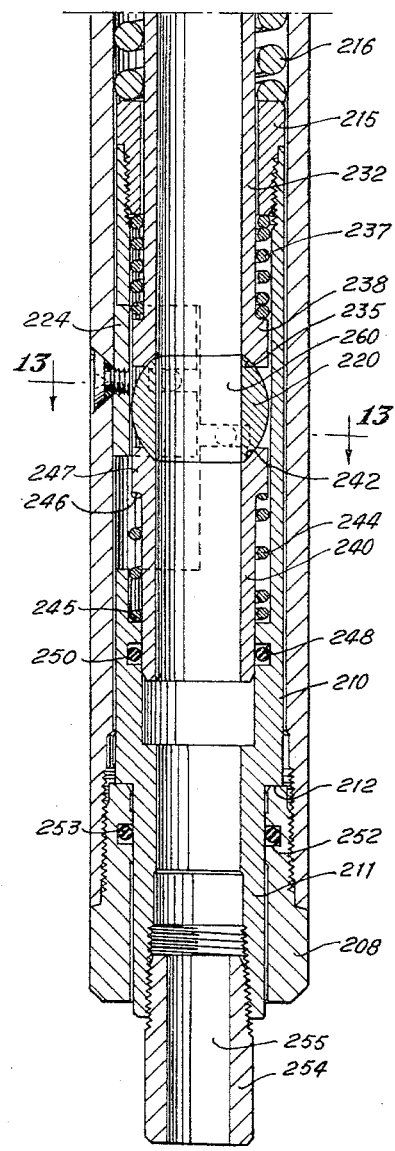
FIGURE 8 is a view similar to and forming a continuation of FIGURE 7 showing the lower portions of the well tool, the ball valve being shown in its open position.
Figure 9:
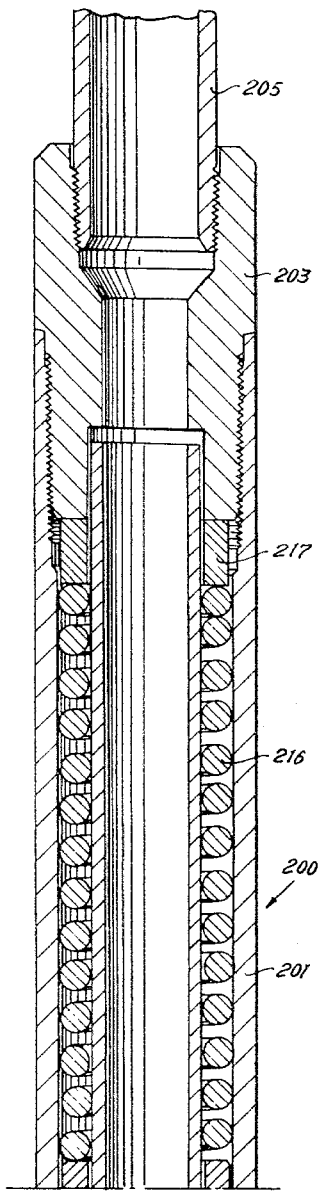
FIGURES 9 and 10 are views similar to FIGURES 7 and 8 showing the ball valve in its closed position.
Figure 10:
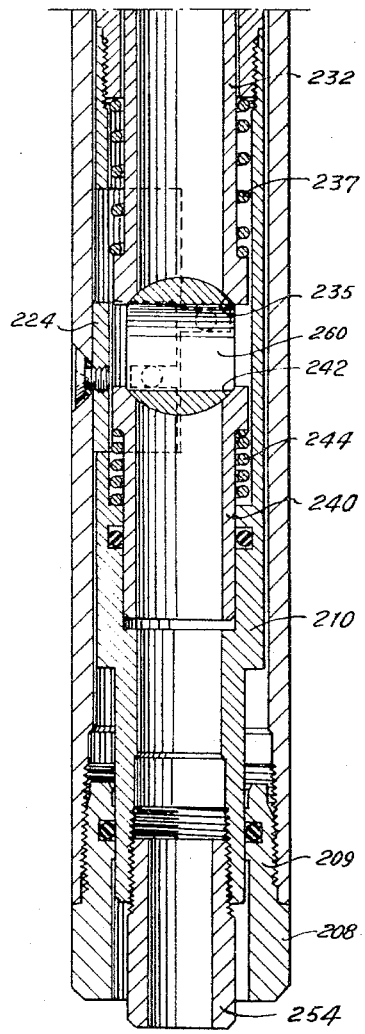

It will be apparent that when the actuating sleeve 210 moves upwardly from the position illustrated in FIGURE 8 to the position illustrated in FIGURE 10, the ball valve will pivot in a counter-clockwise manner about the pivot pins 221 due to the engagement of the actuating pins in the slots 225 of the actuating sleeve from its opening position to its closed position. The slots 225 and 223 provide for lateral movement of the pivot and actuating pins during such rotational movement of the ball valve. Conversely, when the actuating sleeve moves downwardly in the valve housing, the ball valve will be rotated in a clockwise manner about the pivot pins 221 again due to the engagement of the actuating pins 222 in the slots of the actuating sleeve from its closed position to its open position.

An upper valve seat sleeve 232 disposed in the valve housing has its upper end received in the enlarged lower bore portion 233 of the upper sub 203 and extends downwardly through the helical spring 216 and the sleeve retainer 215 to the ball valve. The lower end of the upper sleeve is concave and provides a bearing surface 235 on which the ball valve 220 rides and is slidably moved. The upper sleeve 232 is biased downwardly in the valve housing by a helical spring 237 disposed thereabout and between the lower end of the spring retainer 215 and the external annular flange 238 provided on the lower end of the upper seat sleeve. It will be apparent that opposite ends of the biasing spring bear against the lower end of the spring retainer 215 and the upper surface of the flange 238.

A similar lower valve seat sleeve 240 is longitudinally slidably mounted in the actuating sleeve 210 and has its lower end received in an intermediate section 241 of the bore of the actuating sleeve. The upper end of the lower sleeve is concave and provides a bearing surface 242 on which the ball valve rides and may slidably move. The lower seat sleeve 240 is biased upwardly toward the ball valve 220 by a helical biasing spring 244 disposed about the lower seat sleeve. Opposite ends of the biasing spring abut the upwardly facing annular shoulder 245 of the actuating sleeve and the downwardly facing shoulder 246 on the underside of the external annular flange 247 on the upper end of the lower seat sleeve 240.

The intermediate portion of the actuating sleeve, in which the lower end of the lower seat sleeve 240 is received, is provided with an internal annular recess 248 in which is disposed an O-ring or seal means 250 for sealing between the lower sleeve and the actuating sleeve. A similar internal annular recess 252 is provided in the tubular plug 208 of the valve housing in which is received a similar O-ring or seal means 253 for sealing between the lower reduced portion 211 of the actuating sleeve and the tubular plug.

A bean or tubular flow restricting member 254 threaded in the lower end of the actuating sleeve 210 has an internal bore 255 of smaller orifice than any portion of the bore of the actuating sleeve in order to provide a means for creating a pressure differential across the actuating sleeve to move the actuating sleeve upwardly upon the occurrence of predetermined pressure conditions across the well tool 200. It will be apparent that if a pressure differential exists across the actuating sleeve causing an upwardly acting force on the actuating sleeve which is of sufficient force to overcome the force of the main spring 216 and the force of the lower seat sleeve spring 244, the actuating sleeve will move upwardly in the valve housing. During such movement the engagement of the actuating pins 222 of the ball valve 220 in the slots 225 of the actuating sleeve will cause the ball valve to rotate on the seats 235 and 242 in a counter-clockwise direction about the pivot pins 221 and move upwardly from the open position illustrated in FIGURE 8 wherein the flow passage 260 is aligned with the bores of the upper and lower sleeves to a position wherein the flow passage 260 extends transversely thereof whereby the contact of the ball valve with the seats 242 and 235 of the seat sleeves closes the valve and prevents flow of well fluids therethrough. The O-rings 253 and 250 of course prevent flow of fluids through the valve housing outwardly of the actuating sleeve.

When such pressure differential is removed or eliminated, the main spring 216 will again force the actuating sleeve downwardly from the position illustrated in FIGURE 10 to the position illustrated in FIGURE 8, the ball valve rotating in a clockwise manner and moving downwardly during such movement to a position wherein its flow passage is again aligned with the bores of the seat sleeves. It will be apparent that when the ball valve is in its fully opened position as illustrated in FIGURE 8, the flow of fluids through the valve assembly is rectilinear, without turns or changes in direction of flow.

In use, when it is desired to control the flow of fluids through a well flow conductor such as the flow conductor or well tubing T illustrated in FIGURE 1, the well tool 200 is connected to a suitable anchoring and sealing tool, such as the sealing tool 16 illustrated in FIGURE 1 by means of a pressure equalizing sub, such as that shown on page 4138 of the Composite Catalog of Oil Field Equipment and Services, 1957 edition, the equalizing sub being connected to the lower end of the anchoring and sealing tool 16 and the well tool 200 being anchored or connected to the lower end 205 of the equalizing sub. The function of the equalizing sub is to equalize the pressure between the interior of the valve housing 201 above the ball valve 220 and the exterior of the valve housing.

The assembly of the anchoring and sealing tool, equalizing sub and the valve assembly or well tool 200 is lowered through the tubing string T until the assembly is located and locked in a proper position in the tubing string, in a landing nipple, such as the landing nipple illustrated in FIGURE 1. The ball valve during such movement of the assembly through the tubing string T is in the open position illustrated in FIGURE 8 since the force exerted by the main spring 216 is sufficient to keep the actuating sleeve 210 in the lower position against the resistance of the biasing spring 244. Fluids may then flow upwardly through the bean 255, the actuating sleeve 210, the lower sleeve 240, the flow passage 260 of the ball valve, the upper sleeve 232, the upper sub 203, and thence through the equalizing sub 205 and the anchoring and sealing device to the surface. It will be noted that the flow of fluids is rectilinear through the well tool 200 without any changes in direction of flow.

In the event that abnormal conditions occur which cause the fluid flow through the well tool 200 to surge for any reason, such as, for example, a rupture in the flow line above the well head or in the tubing string above the anchoring and sealing device, a pressure differential will be created across the bean 254 which will exert an upward force on the actuating sleeve 210. As a result, the actuating sleeve moves upwardly against the combined resistances of the main spring 216 and the resistance of the lower seat sleeve spring 244 and during such upward movement moves the ball valve upwardly and rotates it from the position illustrated in FIGURE 8 to the position illustrated in FIGURE 10. The biasing springs 244 and 237 at all times cause the lower and upper sleeves to remain in engagement with the ball valve so that when the ball valve is in the closed position illustrated in FIGURE 10, the engagement of the ball valve with the seats 235 and 242 of the upper and lower sleeve prevents flow of fluids through the well tool. Since, when the ball valve is in the closed position, a pressure differential is caused to exist across the actuating sleeve which acts upwardly on the actuating sleeve, the ball valve will remain in the closed position and will not reopen until the pressure in the valve housing above the ball valve rises so that the combined force of such pressure above the ball valve and the force exerted by the spring 216 are equal to or greater than the force exerted by fluid pressure below the ball valve. Such fluid pressure above the ball valve exerts a force on the upper surfaces of the actuating sleeve since fluid has access between the interior of the upper sleeve and the exterior thereof, the upper end of the sleeve not being in fluid tight engagement with the enlarged bore of the upper sub.

After the abnormal condition which caused the ball valve to be moved to its closed position has cleared or been ended the equalizing sub is actuated by a suitable means, such as an equalizing prong which is lowered through the well conductor or tubing string T to the equalizing sub to cause operative elements of the equalizing sub to move to provide for fluid communication, through the equalizing sub, between the exterior of the valve housing 201 and the interior thereof above the ball valve. When the pressure in the valve housing above the ball valve now increases, such pressure is communicated to the actuating sleeve 210 above the O-ring 250 and, with the fluid pressure acting on the actuating sleeve 210 thus being equalized, the force of the main spring 216 is sufficiently great to cause the actuating sleeve to again move downwardly to the position illustrated in FIGURE 8, the ball valve rotating to its open position during such movement. The equalizing prong is then withdrawn from the equalizing sub and from the tubing string and the well tool or pressure regulated valve assembly again is in condition to operate if another such abnormal condition arises. It will be apparent that the assembly of the anchoring and sealing tool, equalizing sub and pressure valve assembly or well tool 200 may be moved from the tubing string in the usual manner by wire line and running tool.

The pressure differential at which the ball valve will move from the open to closed position may be set at any predetermined value by inserting an adjusting ring 217 of appropriate width. It will be apparent that the greater the width of the ring 217 the greater the compression of the spring 216 and therefore the greater the pressure differential which will be required to move the ball valve to its closed position.

It will be seen that in both forms of the well tool means are provided for moving the ball valve to a lower open position and that the ball valve moves upwardly in the case of the well tool illustrated in FIGURES 1 through 6 when the pressure above the ball valve drops below a predetermined value and in the case of the well tool illustrated in FIGURES 7 through 13 when the pressure differential across the ball valve exceeds a predetermined value.

It will further be seen that in both forms of the well tool the ball valve is pivotally eccentrically mounted in a housing for movement about an axis transverse to the longitudinal axis of the housing between an open position wherein the flow passage of the ball valve is in alignment with the flow passage of the upper and lower sleeves which abut the ball valve and a transverse position wherein the flow passage is closed from communication with passages of such sleeves.

It will further be noted that in the form of the well tool illustrated in FIGURES 1 through 6, the ball valve is biased toward the closed position by the spring 47 while in the form of the well tool illustrated in FIGURES 7 through 13 the ball valve is biased toward its open position by means of the main spring 216.

It will further be seen that in both forms of the well tool the ball valves are adjustable to open at different values of a pressure characteristic, in the case of the valve illustrated in FIGURES 1 through 6, of the value of the fluid pressure in the well tool above the ball valve and, in the case of the well tool illustrated in FIGURES 7 through 13, of the value of the pressure differential between the interior and exterior of the valve housing. In the case of the valve illustrated in FIGURES 1 through 6, the adjustment is obtained by varying the pressure of the charge of gas in the chamber 77 and in the case of the well tool illustrated in FIGURES 11 through 13 the adjustment is obtained by varying the width of the adjusting ring 217.

It will further be seen that in both forms of the well tool resilient means are provided to yieldingly urge the upper and lower sleeves, which abut the ball valve and ball into engagement with one another whereby any wear of the seat or of the ball valves is compensated for.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well tool for controlling the flow of fluids through a well conductor including: a body positionable in a well conductor and having a flow passage extending longitudinally therethrough; a ball valve rotatably mounted in the body in said flow passage and having a flow passage extending therethrough; means pivotally connecting said ball valve eccentrically of its diameter with the body at a point fixed longitudinally of said body; a tubular valve seat member slidable longitudinally in the body flow passage engaging the ball valve and having a longitudinal bore therethrough coacting with said ball valve to open and close the flow passage through the body; actuating means biasing the ball valve toward said tubular valve seat to move said ball valve longitudinally of said body with respect to said pivotal connection therewith to engage said seat member and move therewith as said seat member is moved slidably longitudinally in said body to tend to rotate the ball valve between an open position wherein the flow passages of the ball and the bore of the valve seat member are in aligned flow communication and a closed position wherein the flow passages of the ball and the bore of said valve seat member are out of communication with one another; piston means on said valve seat member in the flow passage of the body downstream of the ball valve coacting with said body providing a chamber adapted to have therein a confined fluid pressure charge biasing the valve seat member longitudinally downstream in the body in a direction to permit movement of the ball valve to closed position; said piston means on the valve seat member providing a pressure surface area on said valve seat member exposed to the pressure of the fluid downstream of the ball valve flowing past the valve seat member and ball valve and present in the body flow passage downstream of the ball valve whereby the pressure of such fluid acts on said pressure surface area for moving the valve seat member upstream longitudinally of said body to move the ball valve to an open position when the pressure of the fluid flowing through the valve seat member and body passage exceeds a predetermined value; said confined fluid pressure charge acting on said piston means to move said seat member downstream of said body when the pressure of the fluid flowing through said ball valve and said seat member downstream of said ball valve is reduced below said predetermined value, said actuating means holding said ball valve in rotatable engagement with said seat member during such movement of seat member downstream of the body whereby the ball valve is rotated to the closed position in which the flow passage therethrough is out of communication with the bore of the valve seat member to close off flow through the body.

2. A well tool for controlling the flow of fluids through a well conductor including: a body positionable in a well conductor having a flow passage extending longitudially therethrough; a ball valve rotatably mounted in the body in said flow passage and having a flow passage extending substantially diametrically therethrough; means pivotally connecting said ball valve eccentrically of its diameter with the body at a point fixed longitudinally of said body; a tubular valve seat member slidable longitudinally in the body flow passage engaging the ball valve and having a longitudinal bore therethrough coacting with said ball valve to open and close the flow passage through the body; means biasing the ball valve toward said valve seat member as said valve seat member slides longitudinally in said body to move said ball valve longitudinally of said body with respect to said pivotal connection therewith to tend to rotate the ball valve to closed position wherein the flow passages of the ball and the bore of the valve seat member are out of communication with one another; said tubular valve seat member having an external annular piston means thereon slidably disposed in said body downstream of the ball valve; means sealing between said piston means and said body and between said seat member and body to direct fluids through said seat member, said seat member having seat means engaging the ball valve; confined fluid pressure charge means between said valve seat member and said body biasing the valve seat member longitudinally downstream in the body in a direction to permit movement of the ball valve to closed position; and means on the valve seat member comprising a pressure surface facing downstream on said valve seat member exposed to the pressure of the fluid flowing past the valve seat member and ball valve and present in the body flow passage downstream of said ball valve whereby the pressure of such fluid acts on said surface for moving the valve seat member upstream longitudinally of said body to move the ball valve to an open position when the pressure of the fluid flowing through the valve seat member and body passage exceeds a predetermined value, said confined pressure charge means moving said valve seat member downstream longitudinally of said body when the pressure of the fluids flowing through the valve seat member and body passage declines below said predetermined value and said ball valve is moved to closed position with respect to said seat member by said actuating member.

3. A well tool for controlling the flow of fluids through a well conductor including: a body positionable in a well conductor and having a flow passage extending longitudinally therethrough; a ball valve rotatably mounted in the body in said flow passage and having a flow passage; means providing an eccentric pivotal connection between said ball valve and said body, whereby movement of said ball valve longitudinally of said body causes rotation of said ball valve about an axis transverse to the longitudinal axis of said body; an actuating member in the body flow passage engaging the ball valve; means biasing the actuating member longitudinally of the body passage toward the ball valve to move said ball valve longitudinally with respect to said pivotal connection therewith to tend to rotate the ball valve to closed position wherein the flow passages of said body and said ball valve are out of communication with one another; an elongate tubular valve seat member slidable longitudinally in the body flow passage downstream of said ball valve; means on said body and said valve seat member defining a closed pressure fluid chamber between said body and said valve seat member; a charge of pressure fluid confined within said chamber biasing the valve seat member longitudinally downstream in the body in a direction to permit longitudinal movement of the actuating member by said biasing means to cause pivotal movement of the ball valve about the pivotal connection thereof with the housing to swing said ball valve about its axis causing movement of the ball valve to closed position; a valve seat on said valve seat member engaging said ball valve and coacting therewith to control communication between the flow passages of the ball valve and the body; and means on the valve seat member comprising a surface on said valve seat member facing downstream of said body passage and exposed to the pressure of the fluid flowing past the valve seat member and ball valve and present in the body flow passage downstream of the ball valve whereby the pressure of such fluid acts on said area for moving the valve seat member upstream longitudinally in said body passage against the force exerted on said valve seat member by said confined pressure charge to move the ball valve to an open position when the pressure of the fluids in the body passage downstream of the ball valve acting on said surface of said seat member exceeds the force of the confined pressure charge and the force of the biasing means acting on said actuating member, said confined charge of pressure fluid within said chamber moving said valve seat member downstream longitudinally of said body when the pressure of the fluid flowing through the valve seat member and the body passage declines below the force of the confined pressure fluid charge and the force of the biasing means acting on said actuating member and said ball valve member moves said ball valve member with said seat member to closed position.

4. A well tool for controlling the flow of fluids including: a tubular body having means therein providing a flow passage extending longitudinally through said body; flow control means in the body flow passage for controlling flow of fluids therethrough, said control means including tubular valve seat means slidable longitudinally in said body and a ball valve having a flow passage extending substantially diametrically therethrough and engaging said seat means for controlling flow of fluid through said body, the ball valve being eccentrically pivotally connected with said body at a fixed point longitudinally of said body and rotatable about its central axis by the pivotal connection between said ball valve and the body when the ball valve is moved longitudinally of said body between a lower open position in which said flow passage of said ball valve communicates with the bore of said tubular valve seat member and an upper closed position in which the flow passage of the ball valve is out of communication with the bore of the tubular seat means to close off flow through the body; actuating means in the body biasing the ball valve toward said valve seat means and toward said upper closed position; and means comprising an external annular piston means having slidable sealing engagement with the body and providing a chamber therebetween adapted to confine a fluid pressure charge biasing said seat means longitudinally downstream of said body toward a position in which the flow passage of the ball valve is out of communication with the bore of the seat means to close off flow through the body, said piston means providing an upwardly facing area on said seat means responsive to the pressure of the fluid in the flow passage of the body downstream thereof above the ball valve for moving the ball valve downwardly to its lower open position when the pressure of the fluid present in the flow passage of the body downstream thereof above the ball valve exceeds a predetermined value in excess of the pressure of the confined fluid pressure charge in said cylinder and the force exerted on the ball valve by said actuating means, said valve seat means and said ball valve being movable to said upper closed position by said confined fluid pressure charge in said cylinder acting on said piston means and by said actuating means biasing said ball valve toward said upper closed position when the pressure of the fluid in the body downstream of the ball valve falls below said predetermined value, the pressure of the fluids flowing through the flow passage of the body and through the ball valve member acting on said upwardly facing area of said piston member to move said ball valve to its lower open position against the force exerted thereon by said confined fluid pressure charge and by said biasing means.

5. A well tool for controlling flow of fluids through a well conductor including: a body having means providing a longitudinal flow passage therethrough; a ball valve having a flow passage extending therethrough and mounted in the body in engagement with said means providing said body flow passage for rotation between a closed position wherein the ball valve flow passage extends transversely of the body flow passage and out of communication therewith and an open position wherein the ball valve flow passage is aligned with the longitudinal flow passage of the body to permit rectilinear flow of fluids through the body; means pivotally connecting said ball valve to said body at a point fixed longitudinally with respect to said body whereby movement of said ball valve longitudinally with respect to said body causes said ball valve to rotate about its axis transverse of the flow passage therethrough between said closed position and said open position; actuating means in said body biasing the ball valve to one of said positions; valve seat means slidable longitudinally in said flow passage of said body in operative engagement with said ball valve and having a confined fluid pressure charge acting thereon biasing said valve seat means downstream of said body, said valve seat means being responsive to predetermined pressure of the fluids flowing through the valve and body and present in the flow passage of the body downstream of the valve in excess of the pressure of the confined fluid pressure charge acting on said valve seat means for moving said valve seat means and said ball valve longitudinally of said body with respect to said pivotal connection between said ball valve and said body for causing rotative movement of the ball valve to the other of said positions against the force of the confined fluid pressure charge acting on said valve seat means biasing said means downstream of the body and the actuating means biasing said ball to said one position, said confined pressure fluid charge moving said valve seat means downstream of said body to permit said ball valve to be moved to closed position in engagement with said valve seat means by said actuating means when the pressure of the fluids flowing through the valve body and present in the flow passage of the body downstream of the ball valve declines below said predetermined value.

6. A well tool for controlling flow of fluids through a well conductor including: a body having means providing a longitudinal flow passage through said body; a rotary valve having a flow passage extending substantially transversely therethrough and mounted for rotatable movement about an axis transverse to the longitudinal flow passage through said body; means providing an eccentric pivotal connection between said rotary valve and said body at a point fixed longitudinally relative to said body, whereby movement of said valve longitudinally of said body causes rotation of said valve about an axis transverse of the longitudinal axis of said body and transverse of the flow passage through said valve, said valve flow passage being disposed for rotation in the body relative to the means providing the body flow passage for rotation between a closed position wherein the valve flow passage extends transversely of the body flow passage and out of communication therewith and an open position wherein the valve flow passage is aligned with the longitudinal flow passage of the body to permit rectilinear flow of fluids through the body; means biasing the rotary valve longitudinally of said body to cause rotation of said valve to one of said positions; valve seat means having an operative engagement with said rotary valve and movable longitudinally of the body responsive to predetermined pressure conditions of the fluids present in the flow passage of the body downstream of the valve and flowing through said valve for causing movement of the valve longitudinally of said body with respect to said pivotal connection therewith to rotate said valve to the other of said positions, said valve seat means and said body having means thereon forming a closed pressure fluid chamber; and a charge of pressure fluid confined within said chamber and acting on said valve seat member to bias said valve seat member in opposition to the movement of said valve seat member in response to the pressure of fluids downstream of the valve, said pressure of said fluid flowing through said valve moving said valve seat member to said other position when said pressure of said fluid flowing through said valve exceeds a predetermined value in excess of said confined fluid pressure charge to move said valve against the forces of said pressure charge and said means biasing said rotary valve to said other position, whereby said rotary valve is moved to said other position, said confined fluid pressure charge moving said valve seat member downstream of said body to permit said ball valve to be moved by said actuating means with said valve seat member to close off flow through the body when pressure of fluid flowing through the ball valve and valve seat member downstream of the ball valve declines below said predetermined value.

7. A well tool for controlling flow of fluids through a well flow conductor including: a body having a flow passage extending longitudinally therethrough; a rotary valve having a transverse flow passage therethrough and mounted in the flow passage of the body for rotation about an axis transverse to the longitudinal flow passage of the body between a closed position wherein the flow passage of said valve is disposed transversely of the flow passage through said body whereby said valve prevents flow of fluids through the flow passage of the body and the valve, and an open position wherein the flow passage is aligned with the body flow passage to permit flow of fluids through the flow passage of the body and said valve; means connecting said valve eccentrically of its axis transverse to the flow passage of said body with the body at a point fixed longitudinally relative to said body whereby longitudinal movement of said valve in said body causes rotation of said valve about said axis transverse to the flow passage of the body; operating means movable longitudinally in the flow passage of said body and engageable with said valve and having an area thereon exposed to the pressure of fluids flowing through said valve and present in the flow passage of the body downstream of said valve and responsive to a predetermined pressure condition of the fluids present in the flow passage of the body and acting on said area for moving said operating means and said valve longitudinally of the body to cause rotative movement of the valve to one of said positions relative to the longitudinal flow passage of the body; confined fluid pressure charge means biasing said operating means for moving the same to a position in which the valve in engagement therewith is disposed in the other of said positions relative to the longitudinal flow passage of the body, said confined fluid pressure charge means acting against the force exerted on said operating means by the pressure of the fluids downstream of the valve acting on the area of said operating means exposed to such fluids to move said operating means longitudinally of said body to said other of said positions relative to the longitudinal flow passage of said body to permit the ball valve to close off flow through the body when the pressure of the fluids flowing through the body downstream of the valve acting on said area of said operating means exposed to such fluid declines below the pressure of the confined fluid pressure charge acting on said operating means; and means resiliently biasing the valve into engagement with and maintaining said valve in engagement with said operating means.

8. A well tool for controlling flow of fluids through a well flow conductor including: a body having means for mounting it within a flow conductor, said body having a flow passage extending longitudinally therethrough; a rotary valve having a transverse flow passage therethrough and mounted in the flow passage of the body for rotation about an axis transverse to the longitudinal flow passage of the body between a closed position wherein the flow passage of said valve is disposed transversely to the flow passage through the body and said valve prevents flow of fluids through the flow passage of the body and the valve, and an open position wherein the flow passage of the valve is aligned with the body flow passage to permit flow of fluids through the flow passage of the body and the flow passage of said valve; means connecting said valve eccentrically of its axis transverse to the flow passage of said body with the body at a point fixed longitudinally relative to said body whereby longitudinal movement of said valve in said body causes rotation of said valve about said axis transverse to the flow passage of the body; operating means movable longitudinally in the flow passage of said body and having a seat portion engageable with said valve and cooperating therewith to close off flow of fluid through said body, said operating means having a surface area thereon exposed to the pressure of fluids flowing through said valve and present in the flow passage of the body downstream of the valve and responsive to a predetermined pressure condition of such fluids acting on said area for moving said operating means and said valve longitudinally of the body to cause rotative movement of the valve to a position in which the flow passage of said valve is aligned with the flow passage of the body to permit flow through said valve and said body; means on said body and said operating means providing a closed pressure chamber having a predetermined charge of fluid pressure confined therein; means on said operating means providing an area exposed to the pressure of the fluid contained within said chamber biasing said operating means longitudinally of said body to a position in which the seat portion of said operating means is disposed at a position in which said valve is in said position with the transverse flow passage of said valve disposed transversely of the flow passage of the body and of said operating means to close off flow upwardly through said operating means and said valve body; said charge of fluid pressure within said chamber biasing said operating means in a direction opposite to and acting against the force exerted on said operating means by the pressure of the fluids in the body downstream of the valve acting on the area of said operating means exposed to the pressure of such fluids flowing through said valve body when the pressure of such fluids flowing through said valve body declines below the pressure exerted on said operating means by said charge of fluid pressure within said closed pressure chamber to move said operating means to said position in which the ball valve closes off flow of fluids through the body; and means resiliently biasing said valve into engagement with and maintaining said valve in engagement with said seat of said operating means.

9. A well tool for controlling the flow of fluids through a well conductor including: an elongate body positionable in a well flow conductor and having a flow passage extending longitudinally therethrough provided with an inlet opening and a discharge opening; a ball valve member rotatably mounted in the body in said flow passage and having a flow passage extending transversely therethrough; means connecting said ball valve member with said body for rotative movement of said ball valve member in said body; an elongate tubular valve seat member slidably mounted in the flow passage of the body downstream of the ball valve member and having a longitudinal flow passage therethrough, said valve seat member engaging said ball valve member and coacting therewith to close off flow through said body when said valve seat member is disposed in a first longitudinal position in said body with the flow passage of said seat member out of communication with the flow passage of the ball valve member; valve seat biasing means in said body between said valve seat member and said valve body and sealed off from fluid pressure exteriorly of said body and upstream of said ball valve member and confined between said valve seat member and said body and biasing said valve seat member longitudinally in said body toward said first position in said body, said ball valve member engaging said valve seat member to close off flow through the body when said valve seat member is in said first position; an actuating member in the body flow passage upstream of the ball valve and engaging the ball valve on the side thereof opposite said valve seat member; resilient means biasing said actuating member toward the ball valve member to move said ball valve member longitudinally of said body with respect to said rotatable connection therewith and toward said valve seat member to maintain the ball valve member in engagement with the valve seat member; and means on the valve seat member providing a pressure surface area exposed to the pressure of fluid flowing through the body and acting on said pressure surface area for moving said valve seat member longitudinally of said body against the force exerted on said valve seat member by said valve seat biasing means to move the seat member and the ball valve in the body toward a second longitudinal position in the body wherein the ball valve member is disposed in engagement with the valve seat member with the flow passage of the ball valve member in communication with the flow passage through the valve seat member to permit fluid flow through the body; said biasing means acting on said valve seat member normally biasing said valve seat member to said first position wherein the ball valve closes the flow passage through the valve seat member and the body to prevent flow of fluid through the body, said fluid pressure of fluids flowing through the valve seat member acting on said pressure surface area moving said valve seat member and ball valve member to said second open position when the pressure of the fluids flowing through the ball valve and the valve seat member and the body passage exceeds a predetermined value in excess of the force exerted on said valve seat member by said biasing means, said valve seat biasing means and said actuating means acting on said valve seat member and said ball valve member to move the valve seat member and the ball valve member to said first closed position when the pressure of the fluids flowing through the valve seat member and ball valve member declines below a predetermined value.

References Cited by the Examiner
UNITED STATES PATENTS

| | | | |
|---|---|---|---|
| 2,509,839 | 5/1950 | Panner | 137—515.5 |
| 2,940,470 | 6/1960 | Morgan | 137—496 |
| 2,998,070 | 11/1961 | Tamplen et al. | 166—224 X |
| 3,007,669 | 11/1961 | Fredd | 166—224 X |
| 3,035,808 | 5/1962 | Knox | 251—62 |
| 3,126,908 | 3/1964 | Dickens | 166—224 X |

M. CARY NELSON, *Primary Examiner.*

CHARLES E. O'CONNELL, MARTIN P. SCHWADRON, *Examiners.*